(12) United States Patent
Oda et al.

(10) Patent No.: US 7,557,054 B2
(45) Date of Patent: Jul. 7, 2009

(54) BORON CARBIDE SINTERED BODY AND PROTECTIVE MEMBER

(75) Inventors: Takehiro Oda, Kirishima (JP);
Masahito Nakanishi, Kirishima (JP);
Teppei Kayama, Kirishima (JP)

(73) Assignee: Kyocera Corporation, Kyoto (JP)

( * ) Notice: Subject to any disclaimer, the term of this patent is extended or adjusted under 35 U.S.C. 154(b) by 92 days.

(21) Appl. No.: 11/679,224

(22) Filed: Feb. 27, 2007

(65) Prior Publication Data

US 2007/0203012 A1    Aug. 30, 2007

(30) Foreign Application Priority Data

Feb. 27, 2006 (JP) ............... 2006-050967
May 30, 2006 (JP) ............... 2006-149689

(51) Int. Cl.
*C04B 35/563* (2006.01)
*C04B 35/565* (2006.01)
*F41H 5/00* (2006.01)

(52) U.S. Cl. ............... 501/90; 501/91; 501/93; 501/87; 89/36.02

(58) Field of Classification Search ........... 501/87, 501/90, 91; 89/36.02
See application file for complete search history.

(56) References Cited

U.S. PATENT DOCUMENTS

| 4,195,066 | A | * | 3/1980 | Schwetz et al. | 423/291 |
| 4,320,204 | A | * | 3/1982 | Weaver | 501/91 |
| 4,524,138 | A | | 6/1985 | Schwetz et al. | |
| 5,418,196 | A | * | 5/1995 | Niihara | 501/87 |
| 5,637,269 | A | * | 6/1997 | Niihara | 264/122 |
| 6,258,741 | B1 | * | 7/2001 | Kohsaka et al. | 501/87 |
| 2008/0227618 | A1 | * | 9/2008 | Horiuchi et al. | 501/90 |

FOREIGN PATENT DOCUMENTS

| JP | 58204873 | 11/1983 |
| JP | 06087654 | 3/1994 |
| JP | 07041365 | 2/1995 |
| JP | 2002167278 | 6/2002 |
| JP | 2003137655 | 5/2003 |
| JP | 2003201178 | 7/2003 |
| JP | 2004026633 | 1/2004 |

OTHER PUBLICATIONS

Robert H. Gassner, Decarburization and Its Evaluation By the Chord Method, Metal Progress, Mar. 1978, pp. 59-63.

* cited by examiner

*Primary Examiner*—Karl E Group
(74) *Attorney, Agent, or Firm*—Volpe and Koenig PC

(57) ABSTRACT

The compressive strength of a boron carbide sintered compact is improved by controlling crystals of the boron carbide to a polycrystalline structure having a grain size distribution in which coarse crystals with a grain size of 20 μm or more and fine crystals with a grain size of 10 μm or less are mixed in an appropriate ratio. Furthermore, a protective member having an improved compressive strength can be provided using the boron carbide sintered compact having a polycrystalline structure in which coarse crystals and fine crystals are mixed in an appropriate ratio or a boron carbide sintered compact containing graphite and silicon carbide.

9 Claims, 7 Drawing Sheets

BORON CARBIDE SINTERED BODY AND PROTECTIVE MEMBER

BACKGROUND OF THE INVENTION

1. Field of the Invention

The present invention relates to a boron carbide sintered compact having a light weight and good mechanical properties, and to a protective member used for a protector that reduce the penetration power of a projectile, such as a bullet or an artillery shell, to protect human bodies, vehicles, vessels, and aircraft.

2. Description of the Related Art

With recent tense international situations, the demand for protective members has been increasing. These protective members require a light weight, and in addition, a high compressive strength because a high compressive stress is applied from a bullet, an artillery shell, or the like to the protective members. An example of such a material having a light weight and excellent mechanical properties is a boron carbide sintered compact, which has been practically used as a protective member against a bullet, an artillery shell, or the like.

An example of a boron carbide sintered compact is boron carbide described in Japanese Patent Application No. 58-80257 (Japanese Unexamined Patent Application Publication No. 58-204873). According to this patent document, a fine granular mixture containing α-silicon carbide, boron carbide, and carbon and/or an organic substance that cokes is sintered without applying pressure. The resulting sintered compact is then compressed again by hot isostatic pressing (HIP) in a high-pressure autoclave using an inert gas as a pressure-transmitting medium to produce a boron carbide sintered compact.

However, this boron carbide sintered compact is produced by a complex process including sintering a fine granular mixture containing α-silicon carbide, boron carbide, and carbon and/or an organic substance that cokes without applying pressure, and compressing again the resulting sintered compact by hot isostatic pressing (HIP) in a high-pressure autoclave using an inert gas as a pressure-transmitting medium. Accordingly, the sintered compact cannot be produced at low cost. Furthermore, when carbon is used, both graphitizable carbon having a layered crystal structure and non-graphitizable carbon having a crystal structure with a cross-linked lattice are present. As a result, fine pores and amorphous portions are easily formed inside coke, resulting in a problem of unstable mechanical properties of the sintered compact. When an organic substance that cokes is selected, the variation in the quality of coke is significant, and crystallinity of the coke is also low. Accordingly, as in the case where carbon is selected, satisfactory mechanical properties, such as compressive strength, cannot be stably obtained.

According to Japanese Unexamined Patent Application Publication No. 7-41365, a mixture prepared by mixing a boron carbide powder and a component composed of a preceramic organic silicon polymer selected from the group consisting of polysiloxanes, polysilazanes, polysilanes, metallopolysiloxanes, and metallopolysilanes is molded under pressure at about 500° C. or lower so as to have a desired shape. The compact is then sintered in an inert gas atmosphere at about 2,200° C. or higher to produce a boron carbide sintered compact.

However, since charcoal is produced from the preceramic organic silicon polymer selected from the group consisting of polysiloxanes, polysilazanes, polysilanes, metallopolysiloxanes, and metallopolysilanes, the variation in quality of the charcoal is significant, and crystallinity of the charcoal is also low. Accordingly, satisfactory mechanical properties cannot be stably obtained.

According to Japanese Unexamined Patent Application Publication No. 2003-201178, a mixture of a solvent and a boron carbide powder coated with a polymeric organic substance that is not substantially dissolved in the solvent is molded under pressure to prepare a compact. The compact is then sintered to produce a boron carbide sintered compact which contains graphite crystal grains in an amount in the range of 1 to 5 parts by weight and in which these graphite crystal grains are mainly present on triple points of the boron carbide crystal grains.

The presence of the graphite crystal grains mainly disposed on the triple points of the boron carbide crystal grains accelerates densification, thereby improving mechanical properties to some degree. However, for the application to protective members, only the graphite crystal grains cannot strongly bind boron carbide grains, and a satisfactory compressive strength cannot be provided.

Other four examples of a boron carbide sintered compact will now be described.

First, Japanese Unexamined Patent Application Publication No. 6-87654 describes a boron carbide sintered compact produced by mixing 15 to 40 volume percent of graphite, 10 volume percent or more of a boron carbide powder X having an average particle diameter of 7 μm or 12 μm, and 30 volume percent or more of another boron carbide powder Y having an average particle diameter of 12 μm or 30 μm to prepare a base powder; filling a die with the base powder; molding the base powder at a temperature in the range of 480° C. to 600° C. under pressure to prepare a compact; and sintering the compact at 2,150° C. under normal pressure. According to the description, only the average particle diameters of the boron carbide powders X and Y are limited so that the average particle diameter of the boron carbide powder X is ½ or less of the average particle diameter of the boron carbide powder Y.

Secondly, Japanese Unexamined Patent Application Publication No. 2003-137655 describes a boron carbide sintered compact containing 99.5 to 70 mole percent of boron carbide ($B_4C$) and 0.5 to 30 mole percent of aluminum nitride (AlN) with a relative density of 95% or higher. As described in Example 4 of the patent document, this boron carbide sintered compact is produced by, for example, the following method. Ten mole percent of an aluminum nitride (AlN) powder is added to a boron carbide powder having an average particle diameter of 0.4 μm and the maximum particle diameter of 2.3 μm, and a methanol solvent, which does not readily oxidize the aluminum nitride powder, is added to the mixture to prepare a mixed powder. The mixed powder is molded, and the compact is then sintered while nitrogen gas is continuously supplied to a sintering furnace at a flow rate of 0.006 liter/min or more so that the nitrogen partial pressure in the sintering furnace is $3.1 \times 10^{-4}$ MPa or higher.

In the boron carbide sintered compact produced as described above, the aluminum nitride is easily decomposed during sintering. Consequently, a dense boron carbide sintered compact cannot be stably produced, and therefore, the sintered compact does not have a satisfactory compressive strength.

Thirdly, Japanese Unexamined Patent Application Publication No. 2004-26633 discloses a boron carbide sintered compact containing boron carbide ($B_4C$) and 10 to 25 mole percent of chromium diboride ($CrB_2$) and having a relative density of 90% or higher. In this boron carbide sintered compact, the maximum grain size of boron carbide grains is 100

μm or less, and the ratio (area ratio) of boron carbide grains having a grain size in the range of 10 to 100 μm to boron carbide grains having a grain size of 5 μm or less is in the range of 0.02 to 0.6.

In this boron carbide sintered compact, chromium diboride, which cracks easily when a compressive stress is applied thereto, is present in the grain boundaries. Therefore, in particular, the sintered compact does not have a satisfactory compressive strength.

Finally, Japanese Unexamined Patent Application Publication No. 2002-167278 discloses a protective member for reducing an impact by collision of a projectile, including a boron carbide sintered compact produced by molding a boron carbide powder having an average particle diameter in the range of 0.3 to 1.5 μm by slip casting and then sintering the resulting compact. The boron carbide sintered compact is produced by the following method.

More specifically, a predetermined amount of novolak phenolic resin (specific gravity: 1.18, manufactured by Showa Highpolymer Co., Ltd.) is added to a boron carbide powder (manufactured by Electroschmelzwerk Kempten GmbH) having an average particle diameter of 0.74 μm and a specific gravity of 2.5, and the phenolic resin and the boron carbide powder are mixed in an acetone solution. The acetone is then completely evaporated, and the mixture is then pulverized, thus preparing a boron carbide powder coated with the phenolic resin. The boron carbide powder is mixed with water under stirring so that the content of the boron carbide powder is 25 volume percent and the water content is 75 volume percent. The mixture is further mixed and deaerated in vacuum to prepare a slurry for slip casting. The slurry is poured into a gypsum mold to perform drain casting, and is then sintered in Ar gas at a temperature in the range of 1,200° C. to 2,250° C. for 1 hour 40 minutes and then at 2,250° C. for 30 minutes. However, from the standpoint of mass production, the boron carbide sintered compact produced by this method is not suitable for forming a small and simple shape, for example, a cylindrical shape, an annular shape, or a spherical shape, which is used for protective members. Furthermore, the boron carbide sintered compact does not have a satisfactory compressive strength.

SUMMARY OF THE INVENTION

It is an object of the present invention to provide a boron carbide sintered compact having a high compressive strength and a protective member including the same.

According to an aspect of the present invention, a boron carbide sintered compact has a polycrystalline structure having a grain size distribution of boron carbide crystals in which coarse crystals with a grain size of 20 μm or more and fine crystals with a grain size of 10 μm or less are mixed in an appropriate ratio. Accordingly, cracks formed in the fine crystals by collision of a projectile, such as a bullet or an artillery shell, are diverted by the coarse crystals, thereby suppressing the propagation of the cracks. Therefore, a large amount of energy is required to propagate the cracks. As a result, the compressive strength of the boron carbide sintered compact can be improved.

According to another aspect of the present invention, a protective member is composed of a boron carbide sintered compact having a polycrystalline structure in which coarse crystals and fine crystals are mixed in an appropriate ratio. Accordingly, an effect of suppressing the penetration of a projectile, such as a bullet or an artillery shell, can be enhanced.

According to further aspect of the present invention, a protective member is composed of a boron carbide sintered compact containing graphite and silicon carbide. Accordingly, a protective member having an improved compressive strength can be provided.

DETAILED DESCRIPTION OF THE PREFERRED EMBODIMENTS

Figure 1:
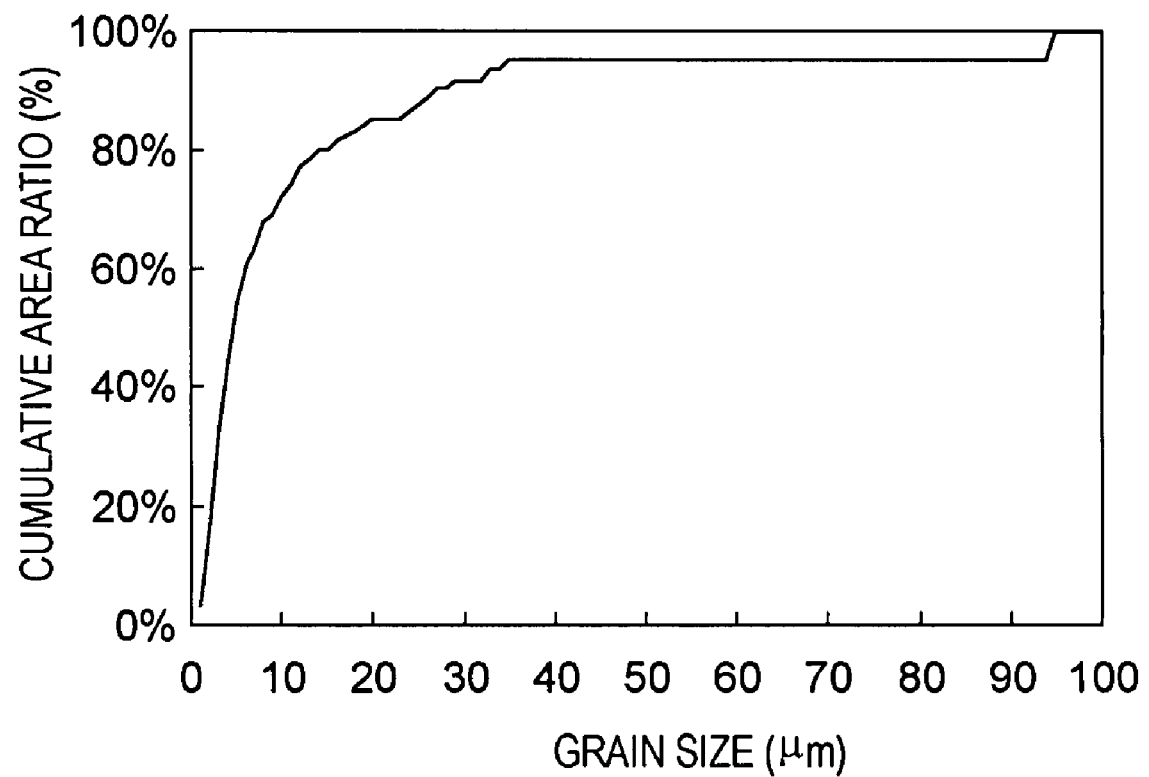
FIG. 1 is a graph showing a cumulative area ratio of the grain size when a boron carbide sintered compact of the present invention is viewed in cross section.

According to an embodiment of the present invention, a boron carbide sintered compact (hereinafter also simply referred to as "sintered compact") contains boron carbide as a main crystal phase, wherein boron carbide crystals in a predetermined area viewed in cross section include crystals having a crystal grain size of 10 μm or less in an amount of 50 area percent or more of the predetermined area and crystals having a crystal grain size of 20 μm or more in an amount of 5 area percent or more of the predetermined area.

Accordingly, the boron carbide sintered compact has a polycrystalline structure in which the coarse crystals with a grain size of 20 μm or more and the fine crystals with a grain size of 10 μm or less are mixed in an appropriate ratio. Accordingly, even when cracks are formed by an impact, cracks formed in the fine crystals are diverted by the coarse crystals, thereby suppressing the propagation of the cracks. Therefore, a large amount of energy is required to propagate the cracks. As a result, a sintered compact having a high compressive strength can be produced. In particular, when this sintered compact is used as a protective member for offering protection from a bullet, an artillery shell, or the like, cracks formed in the fine crystals by collision of a projectile, such as a bullet or an artillery shell, are diverted by the coarse crystals, thereby suppressing the propagation of the cracks. Therefore, a large amount of energy is required to propagate the cracks. As a result, the compressive stress can be increased and penetration of a projectile can be suppressed. It is believed that the reason for this is as follows.

In general, under a compressive stress, a large number of small cracks are stably grown from leading ends of cracks that are present in random directions in a sintered compact. The small cracks propagate in a direction substantially parallel to the compressive axis, while the cracks deviate from the initial propagation directions thereof. The large number of cracks gradually propagate to form a fracture zone, and fracture then occurs. In contrast, under a tensile stress, a single crack is unstably grown in a direction perpendicular to the tensile direction. The speed of crack propagation is rapidly increased at a certain moment, and fracture occurs in a moment. Accordingly, under a tensile stress, a single large crack controls the progress of fracture. On the other hand, under a compressive stress, the average length of a large number of small cracks and the propagation speed of the cracks control the progress of fracture because the large number of small cracks are joined, thereby causing fracture.

In order to improve the compressive strength of a boron carbide sintered compact, it is important to control the crystal structure as follows. As in the case where a tensile stress is applied, when the speed of crack propagation is rapidly increased, it is difficult to control the speed of crack propagation. On the other hand, under a compressive stress, the combination of fine crystals and coarse crystals can increase an effect of diverting crack propagation, compared with the case where a tensile stress is applied. Therefore, an effect of further decreasing the speed of crack propagation (an effect of increasing the time required for crack propagation) can be effectively achieved.

Regarding such a crystal structure of a sintered compact, it is important that boron carbide crystals in a predetermined area viewed in cross section of the sintered compact include crystals having a crystal grain size of 10 µm or less in an amount of 50 area percent or more of the predetermined area and crystals having a crystal grain size of 20 µm or more in an amount of 5 area percent or more of the predetermined area. The initial length of a crack that is present in a sintered compact is proportional to the grain size of the crystal. Accordingly, when the amount of fine crystals having a grain size of 10 µm or less is 50 area percent or more, the initial average length of cracks can be satisfactorily decreased. In addition, the cracks propagating under a compressive stress are diverted by the coarse crystals having a grain size of 20 µm or more contained in an amount of 5 area percent or more. Accordingly, the propagation distance can be increased, thereby improving the fracture strength. It is believed that the compressive strength can be increased by these synergistic effects.

The crystal grain size of a sintered compact can be measured as follows.

First, a cross section of a boron carbide sintered compact is polished with a diamond powder having a particle diameter of 0.3 µm or less to form a mirror finished surface. Thus, a boron carbide sintered compact sample is prepared. A mixture of NaOH and $KNO_3$ with a mass ratio of 1:1 is placed in a crucible, and the crucible is then heated with a gas burner to melt NaOH and $KNO_3$. The above sample is then immersed in this molten solution within one minute, thereby etching the grain boundaries of the sample. The etched sample is observed with an optical microscope at a magnification in the range of 100 to 1,000. For example, the grain sizes of at least 1,000 boron carbide crystal grains observed on the mirror surface having an area of 50,000 to 500,000 $\mu m^2$ are measured by the intercept method, thereby determining the distribution of the crystal grain size. For example, the sizes of at least 1,000 boron carbide crystal grains observed on an etched mirror surface having an area of 10,000 µm×800 µm are measured. The crystal grains measured by the intercept method are selected at random.

FIG. 1 shows an example of a cumulative area ratio (%) of the crystal grain size (µm) of boron carbide in a sintered compact measured by the intercept method. The sizes of 2,000 crystal grains are measured by the intercept method, and the sum of the sizes (µm) of the 2,000 crystal grains is defined as 100%. The measured grain sizes of the crystals are arranged in increasing order of grain size. More specifically, the grain size of the smallest crystal is defined as $D_1$, the grain size of the second smallest crystal is defined as $D_2$, and the grain size of the third smallest crystal is defined as $D_3$. This procedure is continued, and $D_1$ to $D_{2,000}$ are arranged in a table in order. In this step, when there are crystals having the same grain size, they may be arranged in any order. The results are plotted on a graph so that the vertical axis represents the cumulative area ratio (%) in the case where the sum of the sizes of the 2,000 crystal grains (the sum of $D_n$ (n=1 to 2,000)) is defined as 100% and the horizontal axis represents the grain size (µm) determined by the intercept method. By joining the points plotted on the graph, the curve of the cumulative area ratio shown in FIG. 1 can be obtained.

In FIG. 1, the amount of crystals having a crystal grain size of 10 µm or less is 71 area percent, and the amount of crystals having a crystal grain size of 20 µm or more is 16 area percent. FIG. 1 shows the cumulative area ratio of sample No. 43 in examples described below.

A supplementary description will be made of the intercept method. The intercept method, which is also referred to as "Chord method", is described in, for example, Robert H. Gassner, "Decarburization and its Evaluation by the Chord Method", Metal Progress, vol. 113, No. 3, 59-63 (1978) and J. S. Reed, "Introduction to the Principles of Ceramic Processing", 2nd ed. Wiley, New York (1995). In embodiments of the present invention, when a straight line is drawn on a photograph of an etched mirror surface and this straight line crosses over crystals on the photograph, the length of the straight line crossing over each crystal is defined as the grain size of the crystal. When the crystal grain sizes measured by this method are accumulated as described above, a distribution curve of the crystal grain size on the surface viewed in cross section is obtained. Accordingly, the cumulative area ratio (%) is determined from the distribution curve as described above.

When a sintered compact contains aluminum, silicon, yttrium, iron, or the like, it is difficult to identify boron carbide grains with an optical microscope. In such a case, the grain sizes of boron carbide grains can be measured by the following method. For example, crystal grains of boron carbide may be identified utilizing a principle that the color of boron carbide grains, which are composed of a light element, in a backscattered electron image obtained with a scanning electron microscope (SEM) is darker than the color of aluminum, silicon, yttrium, or iron, and the crystal grain sizes of boron carbide may then be determined. Alternatively, crystal grains of boron carbide composed of boron (B) and carbon (C) may be similarly identified with a wavelength-dispersive X-ray microanalyzer (electron probe microanalyzer (EPMA)), and the crystal grain sizes of boron carbide and the distribution thereof may then be determined.

The boron carbide sintered compact of this embodiment preferably contains any one of aluminum, silicon, yttrium, and iron in an amount in the range of 0.05 to 10 mass percent. In such a case, the mass transfer of boron (B) and carbon (C) during sintering is accelerated, and a satisfactorily densified sintered compact can be produced. Accordingly, the compressive strength can be increased. When the content of any one of these elements is less than 0.05 mass percent, the mass transfer of B and C during sintering cannot be satisfactorily accelerated, and therefore, the compressive strength cannot be satisfactorily increased. When the content of any one of these elements exceeds 10 mass percent, a large amount of the metal element is present in the grain boundaries of the boron carbide crystal grains. Consequently, the sintered compact has a low hardness and a low compressive strength, and a projectile may easily pass through the sintered compact. When any one of aluminum, silicon, yttrium, and iron is contained in an amount in the range of 0.05 to 10 mass percent, the sintering temperature can be decreased in some cases. In such a case, the production cost can be decreased.

The content of the metal element, such as aluminum, silicon, yttrium, or iron, contained in the sintered compact can be measured by inductively coupled plasma (ICP) optical emission spectrometry. The relative density is represented by multiplying a value calculated by dividing a density measured by the Archimedes method by the theoretical density by 100. The theoretical density can be determined from the densities of the boron carbide component and another component added as a sintering aid, and the ratio of these components. When a phenolic resin is added, the theoretical density can be determined on the assumption that the phenolic resin is changed to graphite after sintering.

The boron carbide sintered compact of this embodiment is particularly suitable for use as a protective member for offering protection from a projectile, such as a bullet or an artillery shell. The reason for this is as follows. Even when a large number of cracks are formed by a compressive stress applied by a collision of a projectile, such as a bullet or an artillery shell, the cracks are diverted by the coarse crystals, thereby suppressing the propagation of the cracks. Therefore, a large amount of energy is required to propagate the cracks. This energy allows most of the collision energy of the projectile to be consumed. As a result, a sintered compact that is not easily fractured by a compressive stress can be provided, and penetration of the projectile can be suppressed.

More specifically, as described above, when the amount of crystals having a grain size of 10 μm or less in the sintered compact is less than 50 area percent, the initial average length of cracks is increased, thereby decreasing the compressive strength. When the amount of crystals having a grain size of 20 μm or more is less than 5 area percent, the effect of diverting the cracks is decreased, thereby decreasing the compressive strength. Accordingly, it is difficult for the boron carbide sintered compact to suppress penetration of a projectile.

It is believed that, when a sintered compact is used as a protective member, penetration of a projectile is progressed by the following first step and second step. It is believed that, when the boron carbide sintered compact of this embodiment is used, there is an effect of improving the fracture resistance particularly in the second step.

In the first step, first, immediately after a high-speed projectile collides, both the sintered compact and the projectile are deformed, and a part of the collision energy of the projectile is consumed by deforming the sintered compact and the projectile. When the sintered compact has a high hardness, the collided projectile is significantly crushed and deformed. As a result, the sintered compact receives the collision energy of the projectile on a wide area, and cracks are not easily formed in the sintered compact. When the sintered compact has a low hardness, immediately after a projectile collides, the projectile is not easily deformed. Consequently, the collision energy of the projectile cannot be decreased. Furthermore, since the collision area between the projectile and the sintered compact remains small, a local stress is generated on the sintered compact, and cracks are easily generated on the sintered compact. A preferred hardness of a sintered compact for sufficiently deforming a collided projectile is 25 GPa or more in terms of the HK1 hardness measured by the method specified in JIS R 1610-2003. In addition, in order to increase the hardness by decreasing voids, the sintered compact is preferably densified. The relative density of the sintered compact is particularly preferably 90% or higher.

In the second step, the reduced collision energy of the projectile causes a compressive stress on the sintered compact. Under the compressive stress, when the above-described sintered compact includes fine crystals having a grain size of 10 μm or less in an amount of 50 area percent or more, the initial average length of cracks can be sufficiently decreased. Furthermore, cracks propagating under the compressive stress can be diverted by coarse crystals having a grain size of 20 μm or more contained in an amount of 5 area percent or more. Accordingly, the propagation distance is increased to improve the fracture strength. Therefore, the sintered compact can be suitably used as a protective member.

The compressive strength of the protective member of this embodiment is preferably 1.5 GPa or more. The measurement of the compressive stress is suitable for the evaluation of performance as a protective member because a stress can be generated in a collided portion of boron carbide. When the compressive strength is 1.5 GPa or more, generation of microcracks and propagation thereof can be particularly suppressed. Accordingly, a protective member having an excellent penetration resistance against a projectile can be provided. On the other hand, when the compressive strength is less than 1.5 GPa, resistances against generation and propagation of cracks are degraded, thereby decreasing the penetration resistance. Furthermore, the compressive strength is more preferably 2 GPa or more.

Examples of a sintered compact used as the protective member include a cylindrical protective member 1 shown in FIG. 2(*a*), and a protective member 1 shown in FIG. 2(*b*) in which the top surface of a cylinder is convex. A protective plate shown in FIG. 3 can be produced using a plurality of the protective members 1 having either of the above shapes. This protective plate is produced by bonding the plurality of the protective members 1 on the surface of a back plate 2 with a resin 3 therebetween. A fiber-reinforced substance composed of a polybutyral/phenolic fiber-reinforced plastic may be used for the back plate 2. A urethane adhesive may be used for the resin 3. The plurality of the protective members 1 each composed of a boron carbide sintered compact are arranged at the center of the back plate 2 so as to be in the closest packing arrangement. The plurality of the protective members 1 are bonded on the back plate 2 by curing the adhesive under pressure.

Figure 4:
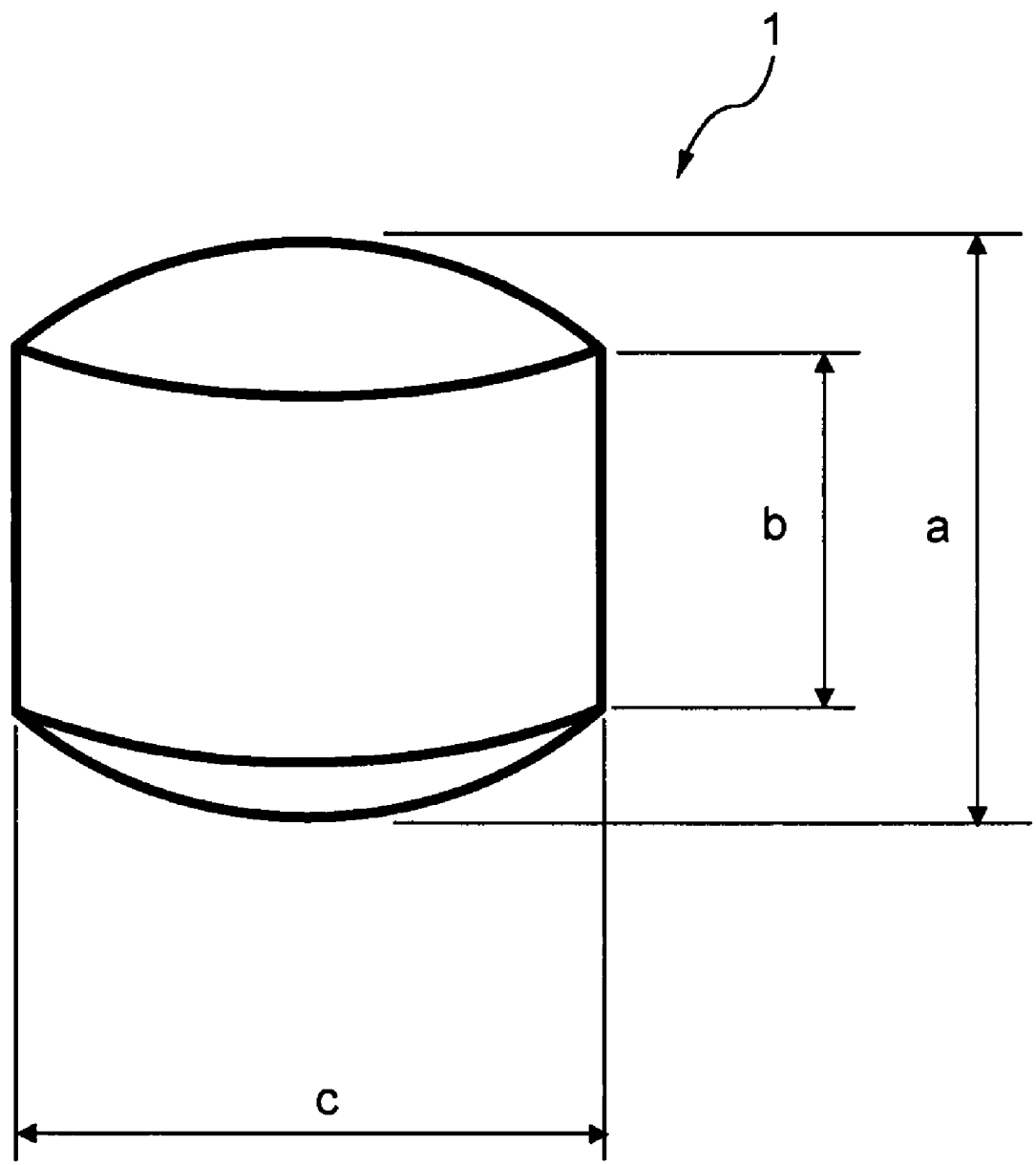
FIG. 4 is a perspective view showing a protective member according to another embodiment of the present invention.

Instead of the protective members 1 shown in FIGS. 2(*a*) and (*b*), a protective member 1 shown in FIG. 4, which has a preferred shape for the protective member, may also be used. The protective member 1 shown in FIG. 4 has a top surface, a bottom surface, and a side circumferential surface connecting the periphery of the top surface and the periphery of the bottom surface wherein at least one of the top surface and the bottom surface is convex. A typical example of the protective member 1 shown in FIG. 4 has a distance a between the top of the top surface and the top of the bottom surface in the range of 10 to 14 mm, a height b of the side circumference surface in the range of 7 to 8 mm, and a diameter c of the side circumference surface in the range of 12 to 14 mm.

Since this structure can allow a projectile to collide with the convex surface, the probability in which the angle of contact formed by the flying direction of the projectile and the normal line of the surface of the protective member is 90° is markedly decreased. As a result, the projectile collides with the protective member while sliding on the surface of the protective member. Consequently, the collision energy is diffused, and cracks are not easily formed in the protective member. Accordingly, a protective member which has a structure capable of satisfactorily suppressing penetration of a projectile, such as a bullet or an artillery shell, and which can satisfactorily protect human bodies, vehicles, vessels, and aircraft can be provided.

Figure 2A:
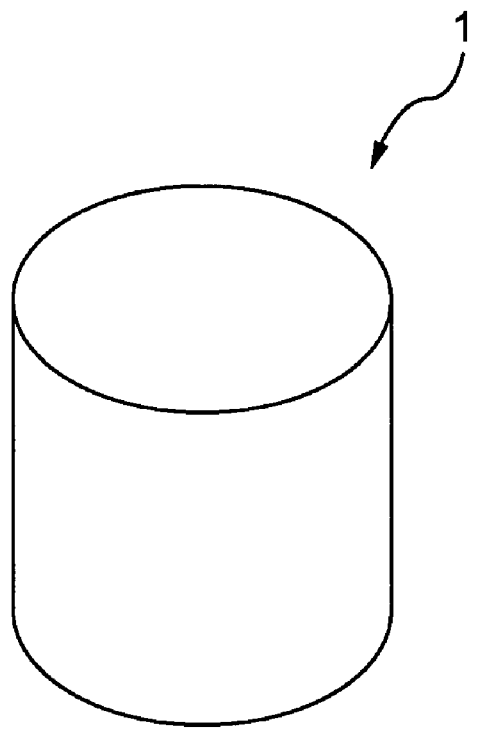
FIG. 2(a) is a perspective view showing a protective member according to an embodiment of the present invention.

The compressive strength can be measured by the method specified in JIS R 1608-2003 using, for example, the protective member 1 having the shape shown in FIG. 2(a). For example, the protective member 1 is processed so as to have a cylindrical shape with an outer diameter d=5±0.1 mm, a height h=12.5±0.1 mm or a cylindrical shape with an h/d of 2.5. Pressure plates are then brought into contact with the top surface and the bottom surface of the protective member 1, and a load is applied to the protective member 1. The maximum load (P) at which the protective member 1 fractures is measured. The compressive strength can be defined as a value $(P/(\pi d^2/4))$ calculated by dividing the maximum load (P) by the cross-sectional area.

A method of producing the boron carbide sintered compact of this embodiment will now be described. It is important that the boron carbide sintered compact of this embodiment be produced by a method including at least three steps described below.

In a first step, a boron carbide powder in which a ratio of $D_{90}/D_{50}$ is 2 or more and $D_{90}$ is 2 μm or more is prepared, wherein $D_{50}$ represents a particle diameter at which the cumulative sum of the volumes of particles constituting the boron carbide powder reaches 50 volume percent in a cumulative particle diameter distribution curve, and $D_{90}$ represents a particle diameter at which the cumulative sum of the volumes of particles constituting the boron carbide powder reaches 90 volume percent in the cumulative particle diameter distribution curve. This powder can be prepared by, for example, mixing a boron carbide powder composed of fine particles with a coarse boron carbide powder.

In a second step, the boron carbide powder is molded, and the resulting compact is then held in argon gas or helium gas, or in vacuum in a temperature range of 1,800° C. or higher and lower than 2,200° C. for 15 minutes to 10 hours. Accordingly, boron carbide particles with a particle diameter of 2 μm or more which are contained in the compact serve as nuclei for grain growth for controlling the amount of crystals having a grain size of 20 μm or more, which are generated in a subsequent third step (densification step), to be 5% or more. When the compact is not held in a temperature range of 1,800° C. or higher and lower than 2,200° C. for 15 minutes to 10 hours, the following problems occur. When the holding temperature is lower than 1,800° C., or when the holding time in a temperature range of 1,800° C. or higher and lower than 2,200° C. is shorter than 15 minutes, boron carbide particles with a particle diameter of 2 μm or more which are contained in the compact do not serve as the nuclei and crystal grains are not grown. Therefore, coarse crystals are not formed. As a result, the amount of crystals with a grain size of 20 μm or more cannot be controlled to 5 area percent or more. When the holding temperature is higher than 2,200° C., or when the holding time in a temperature range of 1,800° C. or higher and lower than 2,200° C. is longer than 10 hours, the crystal grain sizes of the resulting sintered compact become substantially uniform. Accordingly, the amount of crystals having a grain size of 10 μm or less cannot be controlled to 50 area percent or more, and the amount of crystals having a grain size of 20 μm or more cannot be controlled to 5 area percent or more.

In the third step (densification step), after the second step, the compact is held at a temperature in the range of 2,200° C. to 2,350° C. for 10 minutes to 20 hours. Accordingly, the compact is densified, and crystals with a coarse grain size of 20 μm or more in a cross section of the sintered compact are grown in an amount of 5 area percent or more of the cross section. When the above-described ratio of $D_{90}/D_{50}$ is less than 2, the crystal grain sizes of the resulting sintered compact become substantially uniform. Accordingly, the amount of crystals having a grain size of 10 μm or less cannot be controlled to 50 area percent or more, and the amount of crystals having a grain size of 20 μm or more cannot be controlled to 5 area percent or more. When $D_{90}$ is less than 2 μm, the amount of crystals having a grain size of 20 μm or more is less than 5 area percent. When the holding temperature is lower than 2,200° C., or when the holding time in a temperature range of 2,200° C. to 2,350° C. is shorter than 10 minutes, densification is inhibited, thereby decreasing the hardness. The resulting boron carbide sintered compact has, for example, an HK1 hardness of less than 25 GPa. When the holding temperature is higher than 2,350° C., or when the holding time in a temperature range of 2,200° C. to 2,350° C. is longer than 20 hours, the grain growth is excessively accelerated, and the amount of crystals having a grain size of 10 μm or less is less than 50%. Herein, the phrase "a sintered compact is dense" means that the relative density of the sintered compact is 90% or higher. When the compact is held at 2,000° C. or higher, decomposition of boron carbide and an additive component occur. Therefore, in such a case, the compact is preferably held in argon gas or helium gas.

In the second step and the third step, the compact may be sintered while being mechanically pressed. When the sintering is performed while pressing, the second and third temperature ranges may be changed, for example, as follows. When a pressure in the range of 10 to 50 MPa is applied, the holding temperature in the second step is in the range of 1,800° C. to 2,100° C., and holding temperature in the third step is in the range of 2,100° C. to 2,300° C.

A more preferable method of producing the boron carbide sintered compact of this embodiment will now be described. First, a boron carbide powder, which is a main starting base powder, is prepared. The boron carbide powder to be prepared is not limited to a powder in which the molar ratio of B to C (B/C ratio) is stoichiometrically 4, that is, a powder composed of particles having a composition of $B_4C$, and the following powders may also be used. Boron carbide ($B_4C$) has a wide solid-solution region for B and C. Therefore, examples of commercially available boron carbide powders include the powder in which the molar ratio of B to C (B/C ratio) is stoichiometrically 4; powders containing not only the powder in which the molar ratio of B to C (B/C ratio) is stoichiometrically 4 but also a powder in which the B/C ratio is stoichiometrically 3.5 or more and less than 4 or a powder in which the B/C ratio is stoichiometrically more than 4 and 10 or less, such as $B_{13}C_2$; and powders containing not only the powder in which the B/C ratio is stoichiometrically 4 but also containing free carbon, boric acid $(B(OH)_3)$, boric anhydride $(B_2O_3)$, iron (Fe), aluminum (Al), silicon (Si), or the like. These boron carbide powders may be prepared. When these powders are used as the base powder, these powders can be sintered by adding a sintering aid or can be sintered while a mechanical pressure is applied. The boron carbide powder is preferably a fine powder having an average particle diameter of 2 μm or less. However, a boron carbide powder having a large average particle diameter of about 20 μm or a boron carbide powder prepared by preliminary pulverizing this coarse powder may also be used. The preliminary pulverization is preferably a dry pulverization using, for example, a jet mill without using pulverization media from the standpoint that mixing of impurities is reduced.

Next, the prepared boron carbide powder is adjusted so that the ratio of $D_{90}/D_{50}$ is 2 or more and $D_{90}$ is 2 μm or more (except for a powder which has already satisfied the above conditions). An example of this adjusting method is a method of mixing a fine boron carbide powder with a coarse boron carbide powder.

When a sintering aid is added to the boron carbide powder, a substance containing any one of carbon (C), silicon (Si), aluminum (Al), and yttrium (Y) can be selected as the sintering aid. Examples of the substance containing C include amorphous carbon, graphite, and a phenolic resin (which is carbonized at a high temperature to produce carbon). Examples of the substance containing Si include silicon carbide (SiC), silicon nitride ($Si_3N_4$), and silicon (Si). Examples of the substance containing Al include aluminum oxide ($Al_2O_3$) and aluminum nitride (AlN). Examples of the substance containing Y include yttrium oxide ($Y_2O_3$). A powder, an aqueous solution, or the like containing any of these substances is added. Furthermore, a boride such as boric acid ($B(OH)_3$), boric anhydride ($B_2O_3$), metal boron (B), zirconium boride ($ZrB_2$), titanium boride ($TiB_2$), or chromium boride ($CrB_2$) may be added in order to accelerate sintering.

Secondly, a slurry is prepared by a known wet blending process. For example, the prepared boron carbide powder and the sintering aid are fed to a mill, such as a rotating mill, a vibration mill, or a bead mill, and then blended with a solvent, for example, selected from at least one of water, acetone, and isopropyl alcohol (IPA). In order to decrease the viscosity of the slurry, a dispersing agent may be added to the powder prior to pulverization. Examples of media used for the pulverization include media the surfaces of which are coated with an imide resin and media composed of a sintered product of boron nitride, silicon carbide, silicon nitride, zirconia, alumina, or the like. Among these, media composed of a boron nitride sintered product or media the surfaces of which are coated with an imide resin, which are materials that, when used, result in less mixing of impurities into the powder, are preferred.

Thirdly, the slurry is dried to prepare a dry powder. Prior to this drying, the slurry is preferably sieved through a mesh having an opening of #200 or less to remove coarse impurities and contamination. Furthermore, iron and compounds thereof are preferably removed from the slurry with, for example, an iron removal device utilizing a magnetic force. An organic binder, such as paraffin wax, polyvinyl alcohol (PVA), polyethylene glycol (PEG), polyethylene oxide (PEO), or an acrylic resin, is preferably added to the slurry in an amount of 1 to 10 parts by mass relative to 100 parts by mass of the powder in the slurry, and mixed with the slurry because generation of cracks and breaking of the compact can be suppressed during molding described below. Regarding the drying method of the slurry, the slurry may be placed in a container and may be dried by heating. Alternatively, the slurry may be dried with a spray dryer. Alternatively, the slurry may be dried by any other methods.

Fourthly, the dry powder is molded by a known molding method, such as powder pressure molding using a die, or isostatic pressure molding utilizing a hydrostatic pressure to prepare a compact having a desired shape with a relative density in the range of 45% to 70%. In order to produce a protective member having a structure which can more satisfactorily suppress penetration of a projectile, such as a bullet or an artillery shell, the compact preferably has a top surface, a bottom surface, and a side circumferential surface connecting the periphery of the top surface and the periphery of the bottom surface wherein at least one of the top surface and the bottom surface is convex.

Fifthly, when the compact contains an organic binder, the organic binder is debound. The debinding is preferably performed at a temperature in the range of 500° C. to 900° C. under a nitrogen gas stream.

Sixthly, the compact or the debound compact (hereinafter, these are generically referred to as "compact") are sintered as follows using a sintering furnace. A sintering furnace including a graphite resistance heating element for heating is used, and the compact is placed in the sintering furnace. Preferably, the compact is placed in a container for sintering (hereinafter referred to as "jig for sintering") which can surround the entire compact. This is because adhesion of foreign substances which may be adhered from the atmosphere in the sintering furnace to the compact (e.g., carbon pieces vaporized from the graphite heating element and a carbon heat insulating material, and small pieces of other heat insulating materials which are made of an inorganic material and installed in the sintering furnace) is reduced, and in addition, vaporization of volatile components from the compact is reduced. The material of the jig for sintering is preferably graphite. Alternatively, the material of the jig for sintering may be silicon carbide, a composite material of graphite and silicon carbide, or the like. Preferably, the compact is entirely surrounded by the jig for sintering.

Seventhly, the compact placed in the jig for sintering is charged in the sintering furnace. As described above, sintering is performed in argon gas or helium gas, or in vacuum while the temperature is held in the range of 1,800° C. or higher and lower than 2,200° C. for 15 minutes to 10 hours (first step), and then held in the range of 2,200° C. to 2,350° C. for 10 minutes to 20 hours (second step). Thus, the compact is densified so as to have a relative density of 90% or higher. The rate of temperature increase is preferably in the range of 1 to 30° C./min. The term "holding" in the first step and the second step means the total time in which the temperature remains within a predetermined temperature range. For example, the time during which a compact is held at a constant temperature, the temperature-increase time, and the temperature-decrease time constitute the holding time. When the compact is held at 2,000° C. or higher, decomposition of boron carbide and an additive component occurs. Therefore, in such a case, the compact is preferably held in argon gas or helium gas.

In order to further accelerate densification, at the stage where the open pore ratio is 5% or less, the atmosphere may be further pressurized with a high-pressure gas. This pressure method is preferably a method of pressurizing at a gas pressure in the range of 1 to 300 MPa by high-pressure gas pressure sintering (GPS) or hot isostatic pressing (HIP). The relative density can be particularly increased to 95% or higher by this method. Sintering may be performed by a method of applying a mechanical pressure, such as hot pressing or spark plasma sintering (SPS), as required.

The boron carbide sintered compact produced as described above includes crystals having a grain size of 10 μm or less in an amount of 50 area percent or more in a cross section of the sintered compact and crystals having a grain size of 20 μm or more in an amount of 5 area percent or more in the cross section. This sintered compact is dense and has a relative density of 90% or higher. The hardness of this sintered compact is 25 GPa or more in terms of the HK1 hardness measured by the method specified in JIS R 1610-2003. This boron carbide sintered compact can provide a protective member having a light weight and a high compressive strength.

According to a protective member according to another embodiment of the present invention, the compressive strength of the protective member is increased by controlling the composition of a boron carbide sintered compact to a specific range. The protective member is composed of a boron carbide sintered compact containing boron carbide as a main component, graphite, and silicon carbide. It is important that the graphite content in total mass be in the range of 1 to 10 mass percent and the silicon carbide content in total mass be in the range of 0.5 to 5 mass percent.

The term "content in total mass" means the content of each component relative to 100 mass percent of the boron carbide sintered compact.

When the composition of the boron carbide sintered compact is set to this range, boron (B) and carbon (C) are most easily moved during sintering and the compact can be satisfactorily densified. Furthermore, since the boron carbide sintered compact contains graphite and silicon carbide in the specific ratio, the compressive strength, which is a characteristic required for the protective member, can be increased. Since the protective member according to the present invention has a light weight, the burden on a user wearing the protective member is low. Furthermore, since the protective member according to the present invention has a high hardness and a high rigidity, it can be suitable for use as a protective member for offering protection from an impact of a flying bullet, artillery shell, or the like.

Graphite and silicon carbide function as sintering aids during the sintering process of the boron carbide sintered compact. Graphite suppresses an abnormal grain growth of boron carbide grains and accelerates densification of the boron carbide sintered compact. Silicon carbide strongly binds boron carbide grains by a mechanism of vaporization and concentration of the silicon carbide during the sintering process. As a result, the compressive strength of the protective member can be increased. In particular, the silicon carbide is preferably cubic silicon carbide (β-silicon carbide). β-Silicon carbide grows in the form of a sheet to form β-silicon carbide crystal grains. Even when microcracks are formed in the boron carbide sintered compact, the presence of the β-silicon carbide crystal grains suppresses the propagation of the cracks.

In general, under a compressive stress, a large number of cracks propagate in a direction substantially parallel to the compressive direction from leading ends of initial cracks that are randomly present in a boron carbide sintered compact, while the cracks deviate from the initial propagation directions of the cracks. As a result, a fracture zone is formed, and fracture then occurs. As the compressive strength is increased, the crack propagation speed decreases. Therefore, a boron carbide sintered compact having a higher compressive strength can provide an excellent protective member.

Graphite and silicon carbide in the boron carbide sintered compact are identified by, for example, X-ray diffractometry using a CuKα radiation. Graphite can be quantitatively determined by X-ray diffractometry using the Rietveld method.

More specifically, a calibration curve is prepared in advance. Mixed powders each containing a graphite powder and a boron carbide powder are prepared so as to have different composition ratios. The ratio $I(C)/I(B_4C)$ of an area $I(C)$ of an X-ray diffraction peak due to the (002) plane of graphite to an area $I(B_4C)$ of an X-ray diffraction peak due to the (021) plane of boron carbide ($B_4C$) is determined using the mixed powders, thus preparing the calibration curve.

Figure 5:
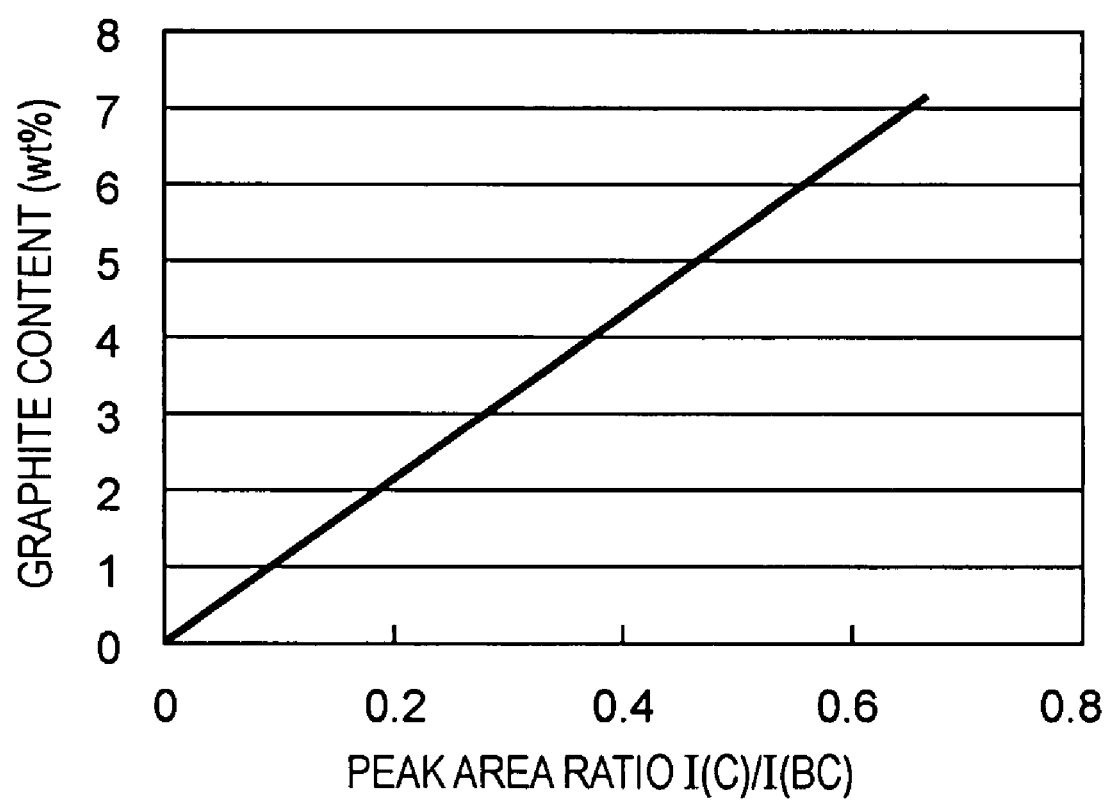
FIG. 5 is a graph showing an example of a calibration curve.

The graphite content of a boron carbide sintered compact is determined using this calibration curve. More specifically, the ratio $I(C)/I(B_4C)$ of the boron carbide sintered compact is determined, and the graphite content can be measured from the calibration curve. An example of such a calibration curve is shown in FIG. 5. Mixed powders were prepared in which the content of a graphite powder was changed in the range of 0 to 7 weight percent relative to a boron carbide powder. The ratios $I(C)/I(BC)$ of the mixed powders were calculated and plotted on the graph. A linear calibration curve was calculated using the least squares method.

Furthermore, the content of silicon carbide can be quantitatively determined by inductively coupled plasma (ICP) optical emission spectrometry. More specifically, the silicon content is measured by ICP, and the silicon content is converted to the SiC content on the assumption that all the Si is present in the form of SiC. The converted vale can be defined as the SiC content.

Figure 6A:
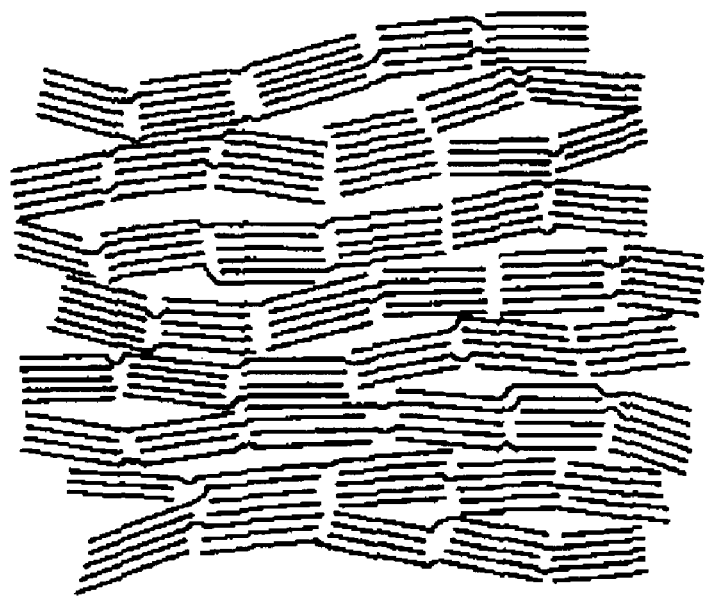
FIG. 6(a) is a schematic view showing the crystal structure of graphitizable carbon.
Figure 6B:
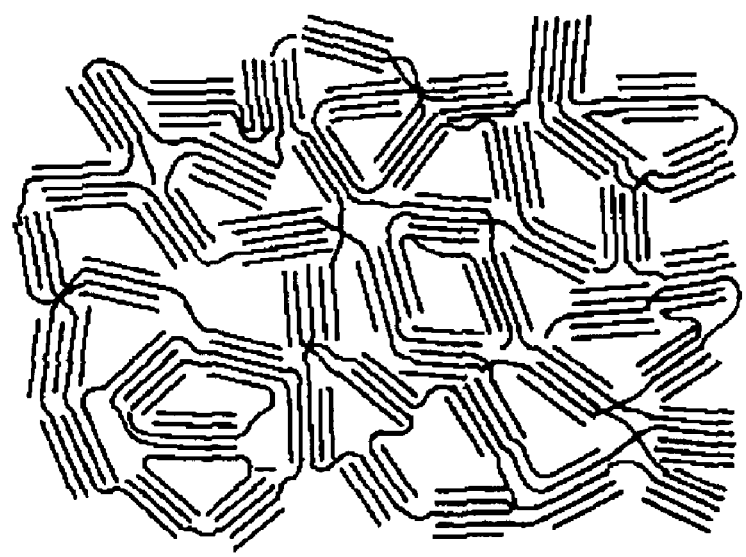
FIG. 6(b) is a schematic view showing the crystal structure of non-graphitizable carbon.

FIGS. 6(a) and (b) schematically show the crystal structures of carbon. FIG. 6(a) shows the crystal structure of graphitizable carbon. FIG. 6(b) shows the crystal structure of non-graphitizable carbon. The graphitizable carbon is a carbon which is easily graphitized when heat-treated at a high temperature of about 3,000° C. and has a density in the range of about 1.8 to 2.1 g/cm³. The non-graphitizable carbon is a carbon which is not easily graphitized even when heat-treated at a high temperature of about 3,000° C. and has a density of 1.5 or higher and less than 1.8 g/cm³.

The crystal structure of graphite affects fine pores in the crystal grains of graphite. As shown in FIG. 6(a), when graphite has a crystal structure in which carbon layer surfaces thereof are orderly aligned, the fine pores in the graphite crystal grains are decreased, thereby increasing the compressive strength. As shown in FIG. 6(b), when the crystal structure of graphite is a random three-dimensional network structure in which long ribbon-shaped laminates on the carbon layer surfaces are intertwisted, the fine pores in the graphite crystal grains are increased, thereby decreasing the compressive strength.

In the protective member of this embodiment, the full width at half maximum of the peak due to the (002) plane of graphite measured by X-ray diffractometry is preferably more than 0° and 0.3° or less. In this case, graphite has the crystal structure shown in FIG. 6(a), and mechanical properties, such as the compressive strength, the flexural strength, the Young's modulus, and the hardness, can be further improved.

Figure 7:
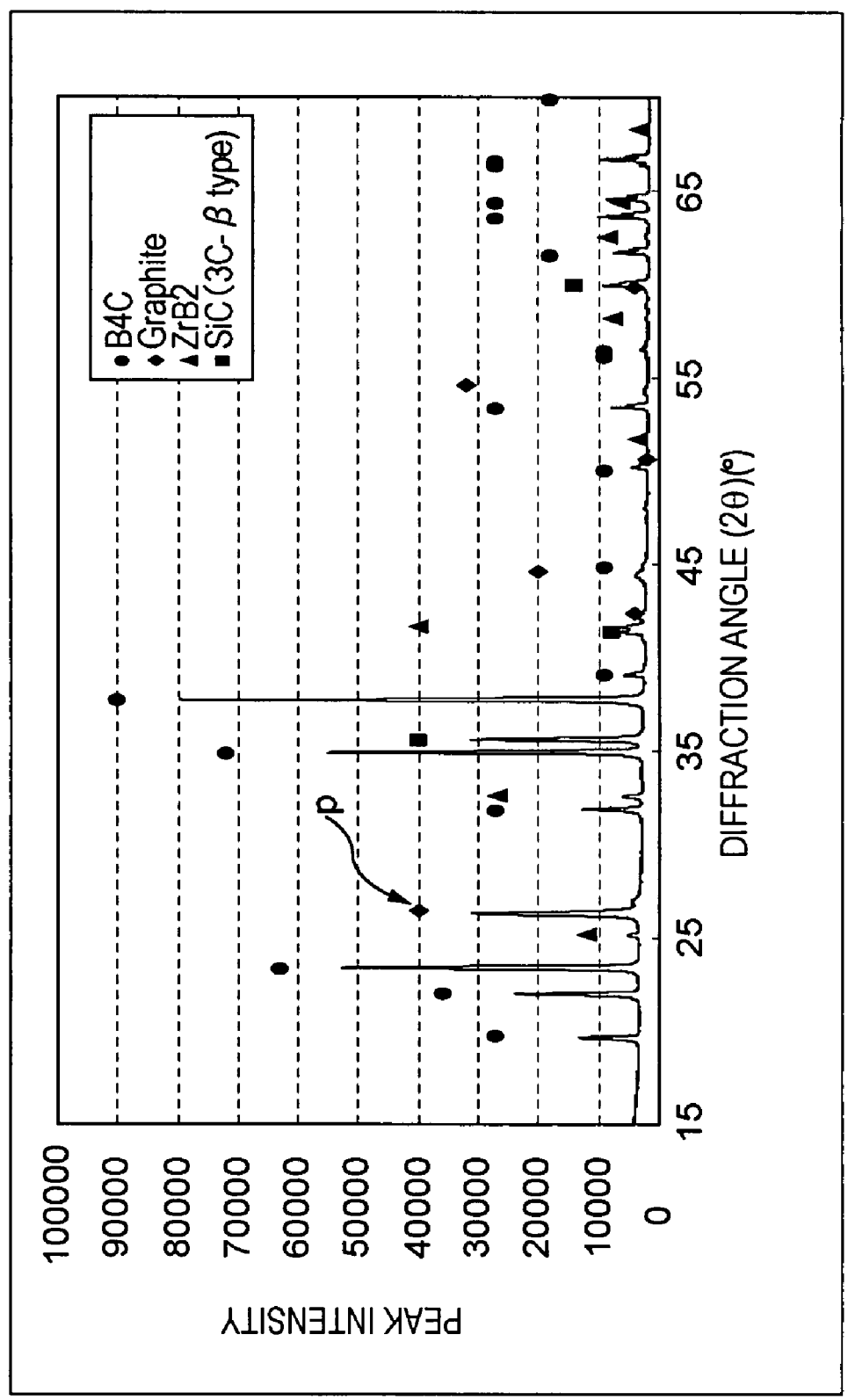
FIG. 7 is an example of an X-ray diffraction chart of a boron carbide sintered compact constituting a protective member of the present invention.

FIG. 7 shows an example of an X-ray diffraction chart of a boron carbide sintered compact constituting the protective member of this embodiment. As shown in FIG. 7, the peak due to the (002) plane is represented by peak (p). The term "full width at half maximum of the peak due to the (002) plane" means the width of the diffraction angle (2θ) at the half maximum value of this peak (p). When this width is 0.3° or less (except for 0°), graphite has the crystal structure shown in FIG. 6(a) and the fine pores in the graphite crystal grains are decreased, resulting in an increase in compressive strength. In particular, the crystal structure of graphite is preferably a hexagonal crystal structure called 2H graphite, which is shown in #41-1487 in JCPDS cards.

Figure 2B:
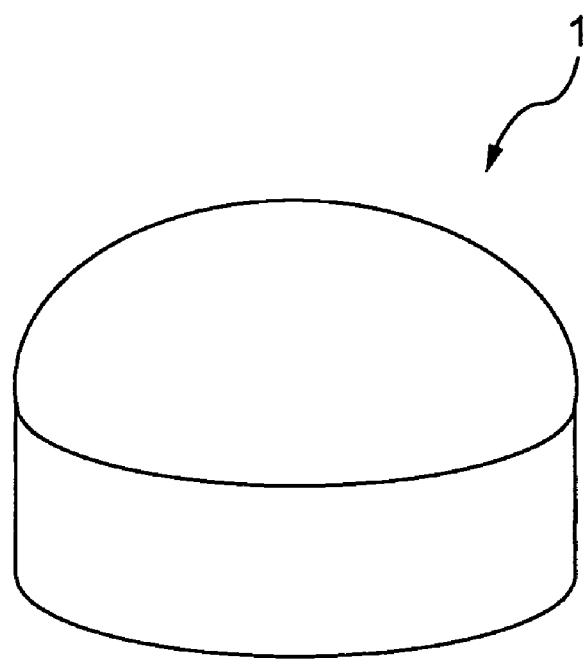
FIG. 2(b) is a perspective view showing a protective member according to another embodiment of the present invention.
Figure 3A:
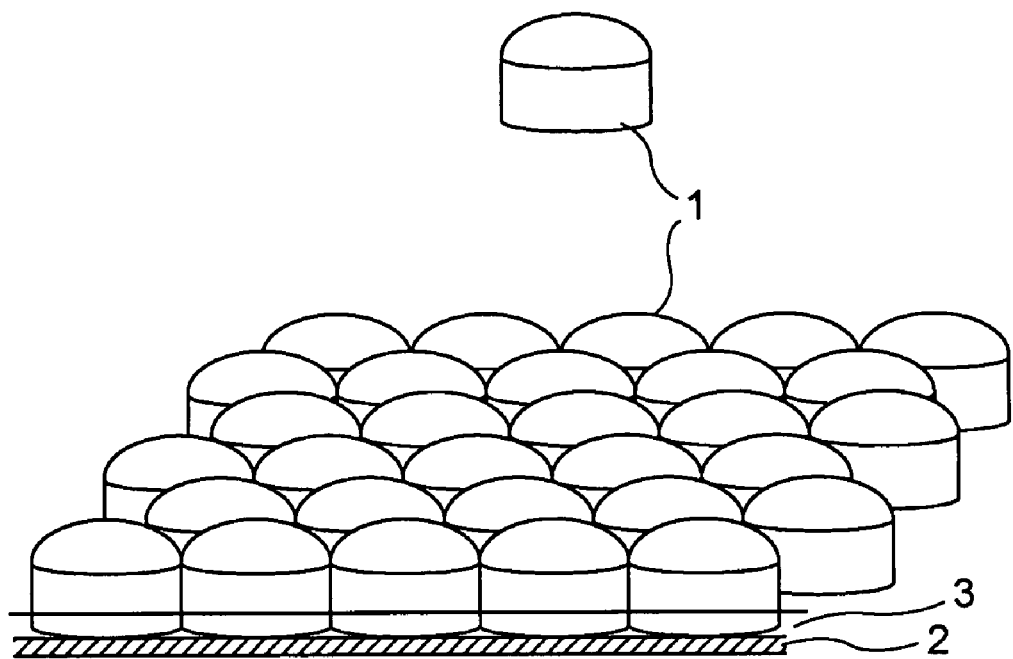
FIG. 3(a) is a perspective view showing an embodiment of a protective plate including protective members.
Figure 3B:
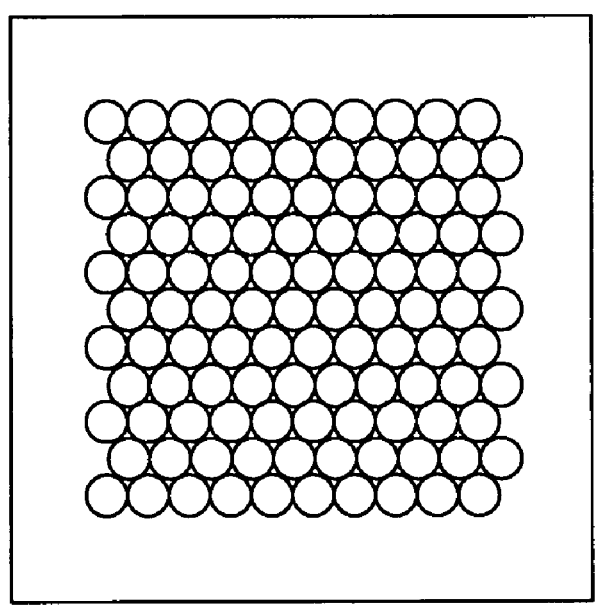
FIG. 3(b) is a plan view of FIG. 3(a).

The protective member may have the cylindrical shape shown in FIG. 2(a), the shape shown in FIG. 2(b) in which the top surface of a cylinder forms a convex surface, or the shape shown in FIG. 4. As shown in FIG. 3, a protective plate can be produced using a plurality of the protective members. More specifically, a fiber-reinforced substance 2 composed of a polybutyral/phenolic fiber-reinforced plastic is used as a back plate, and a plurality of protective members 1 are arranged at the center of the back plate so as to be in the closest packing arrangement. The plurality of the protective members 1 are bonded on the back plate under pressure by curing a resin 3 composed of a urethane adhesive to produce the protective plate.

As shown in FIGS. 2(a), 2(b), and 4, the protective member 1 preferably has a top surface, a bottom surface, and a side circumferential surface connecting the periphery of the top surface and the periphery of the bottom surface wherein at least one of the top surface and the bottom surface is convex. Accordingly, this structure can allow a projectile, such as a bullet or an artillery shell, to collide with the convex surface. Since the probability in which the angle of contact formed by the flying direction of the projectile and the normal line of the surface of the protective member 1 is 90° is markedly decreased, the projectile collides with the protective member 1 while sliding on the surface of the protective member 1. Consequently, the collision energy is diffused, and cracks are not easily formed in the protective member 1. Accordingly, a protective member which has a structure capable of satisfactorily suppressing penetration of a projectile, such as a bullet or an artillery shell, and which can satisfactorily protect human bodies, vehicles, vessels, and aircraft can be provided.

A method of producing the protective member of this embodiment will now be described.

First, a boron carbide powder having an average particle diameter ($D_{50}$) in the range of 0.5 to 2 μm is prepared. The boron carbide powder to be prepared is not limited to a powder in which the molar ratio of B to C (B/C ratio) is stoichiometrically 4, that is, a powder composed of particles having a composition of $B_4C$. Boron carbide ($B_4C$) has a wide solid-solution region for B and C. Therefore, examples of commercially available boron carbide powders include powders containing not only the powder in which the molar ratio of B to C (B/C ratio) is stoichiometrically 4 but also a powder in which the B/C ratio is stoichiometrically 3.5 or more and less than 4 or a powder in which the B/C ratio is stoichiometrically more than 4 and 10 or less, such as $B_{13}C_2$; and powders containing not only the powder in which the B/C ratio is stoichiometrically 4 but also containing free carbon, boric acid ($B(OH)_3$), boric anhydride ($B_2O_3$), iron (Fe), aluminum (Al), silicon (Si), or the like. These boron carbide powders may also be used.

When a graphite powder and a silicon carbide powder are added to the above boron carbide powder as a sintering aid, sintering can be performed without applying a mechanical pressure during sintering. The boron carbide powder is preferably a fine powder having an average particle diameter in the range of 0.5 to 2 μm. However, a boron carbide powder having a large average particle diameter of about 20 μm or a boron carbide powder prepared by preliminary pulverizing this coarse powder may also be used. The preliminary pulverization is preferably a pulverization using, for example, a jet mill without using pulverization media from the standpoint that mixing of impurities is reduced.

In order to control the graphite content in the boron carbide sintered compact to be in the range of 1 to 10 mass percent and the silicon carbide content in the sintered compact to be in the range of 0.5 to 5 mass percent, the content of the graphite powder in the total base powder is controlled to 1 to 10 mass percent, and the content of the silicon carbide powder in the total base powder is controlled to 0.5 to 5 mass percent.

In order to control the full width at half maximum of the peak due to the (002) plane of graphite contained in the boron carbide sintered compact measured by X-ray diffractometry to be 0.3° or less (except for 0°), a graphite powder in which the full width at half maximum of the peak due to the (002) plane is 0.34° or less (except for 0°) is used. A wide full width at half maximum of the graphite powder means a low crystallinity of the graphite powder, and a narrow full width at half maximum of the graphite powder means a high crystallinity of the graphite powder. In order to obtain a graphite powder having a high crystallinity, the distance which carbon atoms can move is limited in a step of graphitizing carbon. More specifically, the orientation of carbon is controlled during this step. For example, a highly oriented pyrolytic graphite (HOPG) powder may be used as such a graphite powder.

In addition to the graphite powder and the silicon carbide powder, in order to accelerate the sintering, at least one of zirconium boride ($ZrB_2$), titanium boride ($TiB_2$), chromium boride ($CrB_2$), zirconium oxide ($ZrO_2$), and yttrium oxide ($Y_2O_3$) may be added as the sintering aid.

A slurry is prepared as in the above-described second procedure using the prepared boron carbide powder and the sintering aids. A sintered compact is produced in accordance with the subsequent third to seventh procedures.

Examples of the present invention will now be described more specifically, but the present invention is not limited to these examples.

EXAMPLE 1

A boron carbide powder containing 0.2 mass percent of Fe wherein $D_{50}$=0.65 μm and $D_{90}$=1.40 μm ($D_{90}/D_{50}$=2.2) was prepared. An aqueous solution of a novolak phenolic resin was prepared as a sintering aid. The boron carbide powder and the sintering aid were fed to a rotating mill together with media for pulverization made of boron nitride and then mixed in acetone for 12 hours to prepare a slurry. The phenolic resin was added so that the amount of residual carbon component was 18 mass percent and the amount of carbon component was 3 mass percent. The resulting slurry was sieved through a nylon mesh having an opening of #200 to remove coarse contamination and the like. The slurry was then dried at 120° C., and the dry slurry was sieved through a nylon mesh having an opening of #40 to regulate the particle size, thus preparing a mixed powder.

The resulting mixed powder was molded by powder pressure molding using a die so as to have a relative density of 58%. Thus, cylindrical compacts each having an outer diameter of 6 mm and a height of 15 mm were molded. The organic component contained in the compacts was debound at 600° C. in a nitrogen gas stream.

The compacts after debinding were placed in a graphite container for sintering and sintered with a sintering furnace including a graphite resistance heating element for heating and the like. The sintering was performed in vacuum while the temperature was less than 1,600° C., and then performed in an argon gas atmosphere at a pressure of 110 kPa while the temperature was 1,600° C. or higher under the conditions of holding 1 shown in Table 1. Subsequently, the sintering was performed under the conditions of holding 2. Thus, eleven samples for a compression test each having an outer diameter of 5 mm and a height of 12.5 mm were prepared. The rate of temperature increase was 20° C./min. Herein, each of the terms "holding 1" and "holding 2" means the total time in which the temperature stays within a predetermined temperature range. The holding time includes the sum of the time during which the compacts were held at a constant temperature and the temperature-increase time. For example, it took 20 minutes to increase the temperature in the range of 1,800° C. or higher and lower than 2,200° C., which was required for holding 1. Therefore, the net time during which the compacts were held at the temperature of holding 1 was calculated by subtracting 20 minutes from the time shown in Table 1. More specifically, in sample No. 7, the temperature was increased in the range of 1,800° C. or higher and lower than 2,200° C. over a period of 8 minutes (at a rate of temperature increase of 50° C./min). In sample No. 8, the temperature was increased in the range of 1,800° C. or higher and lower than 2,200° C. over a period of 15 minutes (at a rate of temperature increase of 26° C./min).

The densities of the prepared samples were measured by the above-described Archimedes method, and the results were calculated as the relative densities. The average of the calculated relative densities of the 11 samples is shown in Table 1. The compressive strength of each sample was measured in accordance with JIS R 1608-2003. The average of the measured compressive strengths of 10 samples is shown in Table 1. Furthermore, as described above, a mirror surface of a cross section of each sample was etched. The sizes of 2,000 crystal grains in the cross section of the central part of the sample were then measured by the intercept method over an observation area of 225,000 $\mu m^2$ (five fields of view each having an area of 250 $\mu m \times 180$ $\mu m$). A grain size distribution was determined on the basis of the results.

Samples of comparative examples which were out of the range of the present invention were prepared as in Example 1 except that the conditions for holding 1 and holding 2 were changed. The samples of the comparative examples were evaluated as those in the examples.

According to the results, in sample No. 1 in which the holding temperature in holding 1 was low and sample No. 7 in which the holding time in holding 1 was short, the area ratio of the crystals having a grain size of 20 $\mu m$ or more was less than 5%. In sample No. 6 in which the holding temperature in holding 1 was high and sample No. 11 in which the holding time in holding 1 was long, the area ratio of the crystals having a grain size of 10 $\mu m$ or less was less than 50%. All of these samples had a low compressive strength. In sample No. 12 in which the holding temperature in holding 2 was low and sample No. 17 in which the holding time in holding 2 was short, the area ratio of the crystals having a grain size of 20 $\mu m$ or more was less than 5% in the cross section and the relative

TABLE 1

| | Sintering conditions | | | | Characteristics of sintered compact | | | |
| | Holding 1 | | Holding 2 | | Area ratio of crystals having a grain size of 10 $\mu m$ or less (%) | Area ratio of crystals having a grain size of 20 $\mu m$ or more (%) | Relative density (%) | Compressive strength (GPa) |
| Sample No. | Temperature (° C.) | Time (hour) | Temperature (° C.) | Time (hour) | | | | |
| --- | --- | --- | --- | --- | --- | --- | --- | --- |
| 1 | 1700 | 1 | 2270 | 2 | 93 | 2 | 98 | 1.2 |
| 2 | 1800 | 1 | 2270 | 2 | 89 | 5 | 98 | 1.7 |
| 3 | 1950 | 1 | 2270 | 2 | 83 | 10 | 98 | 2.2 |
| 4 | 2100 | 1 | 2270 | 2 | 69 | 28 | 98 | 2.8 |
| 5 | 2199 | 1 | 2270 | 2 | 67 | 35 | 99 | 1.8 |
| 6 | 2250 | 1 | 2270 | 2 | 44 | 40 | 99 | 1.1 |
| 7 | Temperature rising | 8 minutes | 2270 | 2 | 91 | 0 | 96 | 1.0 |
| 8 | Temperature rising | 15 minutes | 2270 | 2 | 86 | 6 | 97 | 1.8 |
| 9 | 2100 | 5 | 2270 | 2 | 60 | 33 | 98 | 2.9 |
| 10 | 2100 | 10 | 2270 | 2 | 56 | 36 | 98 | 1.7 |
| 11 | 2100 | 20 | 2270 | 2 | 48 | 39 | 98 | 1.1 |
| 12 | 2100 | 1 | 2200 | 2 | 93 | 0 | 86 | 0.8 |
| 13 | 2100 | 1 | 2230 | 2 | 68 | 7 | 91 | 1.5 |
| 14 | 2100 | 1 | 2300 | 2 | 55 | 18 | 99 | 2.8 |
| 15 | 2100 | 1 | 2350 | 2 | 51 | 44 | 96 | 1.6 |
| 16 | 2100 | 1 | 2380 | 2 | 15 | 70 | 93 | 0.6 |
| 17 | 2100 | 1 | 2270 | 5 minutes | 94 | 3 | 87 | 0.9 |
| 18 | 2100 | 2 | 2270 | 10 minutes | 84 | 8 | 93 | 1.6 |
| 19 | 2100 | 2 | 2270 | 1 | 70 | 25 | 99 | 2.9 |
| 20 | 2100 | 2 | 2270 | 5 | 62 | 31 | 100 | 3.3 |
| 21 | 2100 | 2 | 2230 | 10 | 56 | 35 | 97 | 2.2 |
| 22 | 2100 | 2 | 2230 | 20 | 53 | 36 | 96 | 1.8 |
| 23 | 2100 | 2 | 2230 | 30 | 41 | 40 | 95 | 0.9 |

Sample Nos. 2 to 5 in which the holding temperature in holding 1 was 1,800° C. or higher and lower than 2,200° C., sample Nos. 8 to 10 in which the temperature in holding 1 was held for 15 minutes to 10 hours, sample Nos. 13 to 15 in which the holding temperature in holding 2 was in the range of 2,230° C. to 2,350° C., and sample Nos. 18 to 22 in which the temperature in holding 2 was held for 10 minutes to 20 hours included boron carbide crystals having a grain size of 10 $\mu m$ or less in an amount (area ratio) of 50% or more in an observation area viewed in cross section of the sintered compact and boron carbide crystals having a grain size of 20 $\mu m$ or more in an amount (area ratio) of 5% or more in the observation area. Accordingly, the compressive strength of all these samples was high, 1.5 GPa or more.

density was low. In sample No. 16 in which the holding temperature in holding 2 was high and sample No. 23 in which the holding time in holding 2 was long, the area ratio of the crystals having a grain size of 10 $\mu m$ or less in the cross section was less than 50% and the compressive strength was low.

EXAMPLE 2

As boron carbide powders, a powder A containing 0.42 mass percent of Fe wherein $D_{50}$=0.79 $\mu m$ and $D_{90}$=1.63 $\mu m$ ($D_{90}/D_{50}$ =2.1) and a powder B containing 0.77 mass percent of Fe wherein $D_{50}$=1.90 $\mu m$ and $D_{90}$=3.05 $\mu m$ ($D_{90}/D_{50}$=1.6)

were prepared. Samples Nos. 31 to 34 were prepared by mixing these powders A and B in mass ratios shown in Table 2. A powder C containing 1.1 mass percent of Fe wherein $D_{50}=1.90$ μm and $D_{90}=6.82$ μm ($D_{90}/D_{50}=3.6$ and the particle size distribution curve included two peaks) was also prepared as a boron carbide powder, and sample No. 35 containing only this powder C was prepared. A graphite powder serving as a sintering aid with an average particle diameter of 0.8 μm was added to each of these powders so that the content of the graphite powder was 7 mass percent. Each of the boron carbide powders and the graphite powder were fed to a rotating mill together with media for pulverization made of an imide resin and then mixed in pure water for five hours to prepare a slurry. The resulting slurry was sieved through a nylon mesh having an opening of #200 to remove coarse contamination and the like. Five parts by mass of PVA serving as an organic binder was added to 100 parts by mass of the base powder in the slurry and then mixed. The resulting slurry was dried with a spray dryer and then granulated.

The resulting dry powder was molded, debound, and sintered by the same method as that in Example 1. The holding temperatures during sintering were as follows. In holding 1, the temperature was held at 2,100° C. for one hour, and in holding 2, the temperature was held at 2,300° C. for two hours. The prepared samples were evaluated as in Example 1.

Samples of comparative examples were prepared as in Example 2 except for the conditions shown in Table 2 and evaluated as in Example 2. According to the results, in sample No. 34 in which the ratio of $D_{90}/D_{50}$ was less than 2 and sample No. 31 in which $D_{90}$ was less than 2 μm, the amount of crystals having a grain size of 20 μm or more was less than 5 area percent, and the compressive strength of these samples was low.

EXAMPLE 3

Samples of the present invention were prepared by the same method as that in Example 1 except that the powder C used in Example 2 was used as the boron carbide powder, and 7 parts by mass of a graphite powder having an average particle diameter of 1.2 μm and other additives (having an average particle diameter in the range of 0.2 to 1 μm), whose amounts are shown in Table 3 in terms of parts by mass, were added to the boron carbide powder. The holding temperatures during sintering were as follows. In holding 1, the temperature was held at 1,900° C. for one hour, and in holding 2, the temperature was held at 2,230° C. for two hours. The prepared samples were evaluated as in Examples 1 and 2. When a sintered compact contained aluminum, silicon, yttrium, iron, or the like, as described above, crystal grains of boron carbide

TABLE 2

| | | Boron carbide powder | | | | | Component other than B and C | | Characteristics of sintered compact | | | |
|---|---|---|---|---|---|---|---|---|---|---|---|---|
| Sample No. | Ratio of powder A | Ratio of Powder B | Ratio of Powder C | $D_{50}$ (μm) | $D_{90}$ (μm) | $D_{90}/D_{50}$ (—) | Component | Content (mass %) | Area ratio of crystals having a grain size of 10 μm or less (%) | Area ratio of crystals having a grain size of 20 μm or more (%) | Relative density (%) | Compressive strength (GPa) |
| 31 | 100 | 0 | 0 | 0.79 | 1.63 | 2.1 | Fe | 0.42 | 92 | 2 | 98 | 0.9 |
| 32 | 80 | 20 | 0 | 0.93 | 2.01 | 2.2 | Fe | 0.49 | 85 | 6 | 98 | 1.9 |
| 33 | 50 | 50 | 0 | 1.32 | 2.65 | 2.0 | Fe | 0.6 | 76 | 9 | 98 | 2.1 |
| 34 | 0 | 100 | 0 | 1.90 | 3.05 | 1.6 | Fe | 0.77 | 88 | 4 | 97 | 1.1 |
| 35 | 0 | 0 | 100 | 1.90 | 6.82 | 3.6 | Fe | 1.1 | 70 | 16 | 95 | 2.8 |

In sample Nos. 32, 33, and 35 in which the ratio of $D_{90}/D_{50}$ of the boron carbide powder was 2 or more and $D_{90}$ thereof was 2 μm or more, the area ratio of crystals having a grain size of 10 μm or less was 50 area percent or more and the area ratio of crystals having a grain size of 20 μm or more was 5 area percent or more. Accordingly, the compressive strength of all these samples was high, 1.5 GPa or more.

were identified utilizing a principle that the color of boron carbide grains, which are composed of a light element, in a backscattered electron image obtained with a scanning electron microscope (SEM) is darker than the color of aluminum, silicon, yttrium, or iron, and the crystal grain sizes of boron carbide were then determined. In Table 3, Gr. represents graphite.

TABLE 3

| | Sintering aid | | | | Component other than B and C | | Characteristics of sintered compact | | | |
|---|---|---|---|---|---|---|---|---|---|---|
| Sample No. | Type | Content (mass %) | Type | Content (mass %) | Component | Content (mass %) | Area ratio of crystals having a grain size of 10 μm or less (%) | Area ratio of crystals having a grain size of 20 μm or more (%) | Relative density (%) | Compressive strength (GPa) |
| 40 | Gr. | 7 | — | — | — | — | 92 | 6 | 91 | 1.6 |
| 41 | Gr. | 7 | SiC | 0.03 | Si | 0.02 | 90 | 6 | 91 | 1.6 |
| 42 | Gr. | 7 | SiC | 0.07 | Si | 0.05 | 72 | 10 | 94 | 2.6 |
| 43 | Gr. | 7 | SiC | 2 | Si | 1.4 | 71 | 16 | 97 | 3.3 |

TABLE 3-continued

| | Sintering aid | | | Component other than B and C | | Characteristics of sintered compact | | | |
|---|---|---|---|---|---|---|---|---|---|
| | | | | | | Area ratio of crystals having a grain size of 10 μm or less (%) | Area ratio of crystals having a grain size of 20 μm or more (%) | Relative density (%) | Compressive strength (GPa) |
| Sample No. | Type | Content (mass %) | Type | Content (mass %) | Component | Content (mass %) | | | | |
| 44 | Gr. | 7 | SiC | 7 | Si | 5 | 65 | 21 | 99 | 4.5 |
| 45 | Gr. | 7 | SiC | 14 | Si | 10 | 69 | 20 | 96 | 3.3 |
| 46 | Gr. | 7 | Y$_2$O$_3$ | 0.03 | Y | 0.02 | 93 | 6 | 92 | 1.7 |
| 47 | Gr. | 7 | Y$_2$O$_3$ | 0.06 | Y | 0.05 | 88 | 8 | 93 | 2.2 |
| 48 | Gr. | 7 | Y$_2$O$_3$ | 7 | Y | 5.5 | 57 | 33 | 95 | 2.6 |
| 49 | Gr. | 7 | Al$_2$O$_3$ | 0.1 | Al | 0.05 | 79 | 8 | 92 | 2.2 |
| 50 | Gr. | 7 | Al$_2$O$_3$ | 10 | Al | 5.3 | 66 | 25 | 95 | 2.3 |
| 51 | Gr. | 7 | Al$_2$O$_3$ | 20 | Al | 11 | 51 | 39 | 97 | 1.8 |

Each of the samples of the present invention contained crystals having a grain size of 10 μm or less in an amount of 50 area percent or more in a cross section of the sintered compact and crystals having a grain size of 20 μm or more in an amount of 5 area percent or more in the cross section. Accordingly, all these samples had an excellent and high compressive strength, 1.6 GPa or more.

EXAMPLE 4

As described below, boron carbide sintered compacts having two types of shapes A and B were prepared. In this case, each of the shapes A and B was prepared using two types of materials. A total of four types of boron carbide sintered compacts were prepared. More specifically, regarding the materials, two types of boron carbide sintered compacts were prepared as follows. The boron carbide sintered compact of sample No. 10 was prepared by the method described in Example 1, and the boron carbide sintered compact of sample No. 43 was prepared by the method described in Example 3. Regarding the shapes of the compact, two types of boron carbide sintered compacts were prepared as follows. A cylindrical boron carbide sintered compact 1 (shape A) having an outer diameter of 10 mm and a thickness of 10 mm was prepared, as shown in FIG. 2(a). A convex cylindrical boron carbide sintered compact 1 (shape B) which had an outer diameter of 10 mm and a thickness at the central part shown in FIG. 2(b) of 10 mm and in which the thickness gradually decreased toward the outer periphery with a curvature radius of 10 mm was prepared. One hundred and ten samples were prepared for each of the four types of boron carbide sintered compacts. As shown in FIG. 7, a resin 3 composed of a urethane adhesive was applied on the back surfaces of the 110 samples, and the samples were then bonded on a back plate by curing the resin 3 at 70° C. for 30 minutes while a pressure (1 MPa) was applied. A fiber-reinforced substance 2 (outer size: 140 mm×140 mm, thickness: 9 mm) composed of a polybutyral/phenolic fiber-reinforced plastic that was reinforced with a wholly aromatic polyamide fiber "Kevlar" (registered trademark) manufactured by Du Pont-Toray Co., Ltd. was used as the back plate. As shown in FIG. 3, the boron carbide sintered compacts 4 were arranged near the center of the back plate so as to be in the closest packing arrangement in 11 rows each including 10 samples, thereby preparing a protective plate. As described above, FIG. 1 shows the cumulative area ratio of sample No. 43.

Subsequently, the protective plate was fixed on a table by strongly clamping a peripheral area with a width of about 20 mm of the protective plate (the boron carbide sintered compacts were not bonded on this area) so that the boron carbide sintered compacts were disposed on the front face. A projectile including a central part made of 100C6 steel, an outer periphery made of aluminum, and the outermost surface made of brass with a weight of 10 g was prepared. The projectile was made to collide near the center of the protective plate using a high-speed projectile launcher from a location 15 m from the protective plate at a launching speed of about 330 m/sec. According to the results, when sample Nos. 10 and 43 of the present invention were used, the projectile did not penetrate through the protective plate, regardless of the shapes A and B of the sintered compacts.

Furthermore, the projectile was similarly made to collide near the center of the protective plate at a launching speed of about 830 m/sec. According to the results, the projectile penetrated through the protective plate including each of sample Nos. 10 and 43 having the cylindrical shape (shape A). In contrast, although the average thickness of the boron carbide sintered compact having the shape B was smaller than that of the sintered compact having the shape A, the projectile did not penetrate through the protective plate including each of sample Nos. 10 and 43 having the convex cylindrical shape (shape B). Thus, the effectiveness of the present invention was confirmed.

Protective plates of comparative examples were prepared as in Example 4 except that sample No. 7, which was out of the range of the present invention, was used. The protective plates were evaluated as in Example 4.

According to the results, when boron carbide sintered compacts having either the cylindrical shape (shape A) or the convex cylindrical shape (shape B) were used, the projectile penetrated through the protective plate at a launching speed of either about 330 m/sec or about 830 m/sec.

EXAMPLE 5

A boron carbide powder containing 0.2 mass percent of Fe wherein $D_{50}$=0.65 μm and $D_{90}$=1.40 μm ($D_{90}/D_{50}$=2.2) was prepared. Powders having the compositions shown in Table 4 were prepared as sintering aids. The boron carbide powder and the sintering aids were fed to a rotating mill together with media for pulverization made of boron nitride and then mixed in acetone for 12 hours to prepare a slurry. The resulting slurry was sieved through a nylon mesh having an opening of #200 to remove coarse contamination and the like. The slurry was then dried at 120° C., and the dry slurry was sieved through a nylon mesh having an opening of #40 to regulate the particle size, thus preparing a mixed powder.

The resulting mixed powder was molded by powder pressure molding using a die so as to have a relative density of 58%. Thus, cylindrical compacts each having an outer diameter of 6 mm and a height of 15 mm were molded. The organic component contained in the compacts was debound at 600° C. in a nitrogen gas stream.

The compacts after debinding were placed in a graphite container for sintering and sintered with a sintering furnace including a graphite resistance heating element for heating and the like. The temperature was increased at a rate of 20° C./min. The sintering was performed in vacuum while the temperature was less than 1,600° C., and then performed in an argon gas atmosphere at a pressure of 110 kPa while the temperature was 1,600° C. or higher. During the temperature increase in sintering, the temperature was held at 2,100° C. for one hour. The temperature was then further increased, and held at 2,300° C. for two hours. A total of nineteen types of samples (sample Nos. 1 to 19) were prepared. Ten cylindrical samples each having an outer diameter of 5 mm and a height of 12.5 mm were prepared for each sample number.

Components, such as graphite and silicon carbide, contained in the prepared samples were identified by X-ray diffractometry using a CuKα radiation. Graphite was quantitatively determined by X-ray diffractometry using the above-described Rietveld method. The content of silicon carbide was calculated by inductively coupled plasma (ICP) optical emission spectrometry as described above. The results are shown in Table 4.

The compressive strength of each sample was measured in accordance with JIS R 1608-2003, and the averages of the measured compressive strengths of 10 samples are shown in Table 4.

TABLE 4

| No. | Type | Content (mass %) | Type | Content (mass %) | Type | Content (mass %) | Full width at half maximum of peak due to (002) plane | Compressive strength (GPa) | Remarks |
|---|---|---|---|---|---|---|---|---|---|
| 1 | Graphite | 5 | — | — | — | — | 0.3 | 1.3 | |
| 2 | Silicon carbide | 5 | — | — | — | — | — | 0.8 | |
| 3 | Carbon black | 5 | — | — | — | — | 0.36 | 1.1 | |
| 4 | Graphite | 0.5 | Silicon carbide | 3 | — | — | 0.3 | 1.9 | |
| 5 | Graphite | 1 | Silicon carbide | 3 | — | — | 0.29 | 2.8 | |
| 6 | Graphite | 1 | Silicon carbide | 3 | — | — | 0.3 | 2.7 | |
| 7 | Graphite | 1 | Silicon carbide | 3 | — | — | 0.36 | 2.3 | A phenolic resin was used as a sintering aid. |
| 8 | Graphite | 5 | Silicon carbide | 0.2 | — | — | 0.3 | 1.9 | |
| 9 | Graphite | 5 | Silicon carbide | 0.5 | — | — | 0.3 | 2.5 | |
| 10 | Graphite | 5 | Silicon carbide | 3 | — | — | 0.3 | 3.4 | |
| 11 | Graphite | 5 | Silicon carbide | 5 | — | — | 0.3 | 2.9 | |
| 12 | Graphite | 5 | Silicon carbide | 10 | — | — | 0.3 | 1.8 | |
| 13 | Graphite | 10 | Silicon carbide | 3 | — | — | 0.3 | 2.8 | |
| 14 | Graphite | 15 | Silicon carbide | 3 | — | — | 0.3 | 1.9 | |
| 15 | Graphite | 5 | Silicon carbide | 3 | Zirconium boride | 1 | 0.3 | 3.3 | |
| 16 | Graphite | 5 | Silicon carbide | 3 | Titanium boride | 1 | 0.3 | 3.1 | |
| 17 | Graphite | 5 | Silicon carbide | 3 | Chromium boride | 1 | 0.3 | 3.2 | |
| 18 | Graphite | 5 | Silicon carbide | 3 | Yttrium oxide | 1 | 0.3 | 2.9 | |
| 19 | Graphite | 5 | Silicon carbide | 3 | Zirconium oxide | 1 | 0.3 | 3.5 | |

Sample Nos. 1 and 3, which were out of the range of the present invention, did not contain silicon carbide. Therefore, the compressive strength of these samples was low, 1.3 GPa or less.

Sample No. 2, which was out of the range of the present invention, did not contain graphite. Therefore, densification of the sintered compact did not proceed, and the compressive strength of the sample was as low as 0.8 GPa.

In contrast, sample Nos. 4 to 19 of the present invention contained both graphite and silicon carbide. Therefore, densification proceeded and the boron carbide grains were strongly bound. Accordingly, the compressive strength of these samples was high, 1.7 GPa or more.

In particular, in sample Nos. 5 to 7, 9 to 11, 13, and 15 to 19, which contained graphite in an amount in the range of 1 to 10 mass percent of the boron carbide sintered compact and silicon carbide in an amount in the range of 0.5 to 5 mass percent of the boron carbide sintered compact, densification satisfactorily proceeded. Therefore, the compressive strength of these samples was higher than that of other samples, i.e., 2.3 GPa or more. Thus, these samples had excellent compressive strength.

Compared with sample Nos. 5 to 7 each containing 3 mass percent of graphite and 1 mass percent of silicon carbide, as the full width at half maximum of the peak due to the (002) plane of graphite measured by X-ray diffractometry decreased, the compressive strength was increased. When the full width at half maximum was 0.3° or less (except for 0°), the compressive strength was 2.7 GPa or more, which was particularly preferred.

What is claimed is:

1. A protective member comprising: a boron carbide sintered compact containing boron carbide serving as a main component, graphite whose content in total mass is in the range of 1 to 10 mass percent, and silicon carbide whose content in total mass is in the range of 0.5 to 5 mass percent.

2. The protective member according to claim 1, wherein the full width at half maximum of the peak due to the (002) plane of the graphite measured by X-ray diffractometry is more than 0° and 0.3.° or less.

3. The protective member according to claim 1, wherein the boron carbide sintered compact has a top surface, a bottom surface, and a side circumferential surface connecting the periphery of the top surface and the periphery of the bottom surface in which at least one of the top surface and the bottom surface is convex.

4. The protective member according to claim 2, wherein the boron carbide sintered compact has a top surface, a bottom surface, and a side circumferential surface connecting the periphery of the top surface and the periphery of the bottom surface in which at least one of the top surface and the bottom surface is convex.

5. The protective member according to claim 1, wherein the silicon carbide is .beta.-silicon carbide.

6. The protective member according to claim 2, wherein the silicon carbide is β-silicon carbide.

7. The protective member according to claim 3, wherein the silicon carbide is β-silicon carbide.

8. The protective member according to claim 4, wherein the silicon carbide is β-silicon carbide.

9. The protective member according to claim 2, wherein the boron carbide sintered compact further comprises at least one of zirconium boride, titanium boride, chromium boride, zirconium oxide, and yttrium oxide.

* * * * *